United States Patent
Aulin et al.

(10) Patent No.: US 9,883,414 B2
(45) Date of Patent: Jan. 30, 2018

(54) BACKHAUL COMMUNICATION IN WIRELESS NETWORKS

(71) Applicant: Telefonaktiebolaget L M Ericsson (publ), Stockholm (SE)

(72) Inventors: Jocelyn Aulin, Västra Frölunda (SE); Gary Boudreau, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 152 days.

(21) Appl. No.: 14/648,397

(22) PCT Filed: Dec. 14, 2012

(86) PCT No.: PCT/EP2012/075647
§ 371 (c)(1),
(2) Date: May 29, 2015

(87) PCT Pub. No.: WO2014/090344
PCT Pub. Date: Jun. 19, 2014

(65) Prior Publication Data
US 2015/0304867 A1     Oct. 22, 2015

(51) Int. Cl.
*H04W 24/08* (2009.01)
*H04B 7/024* (2017.01)
(Continued)

(52) U.S. Cl.
CPC ............ *H04W 24/08* (2013.01); *H04B 7/024* (2013.01); *H04W 16/28* (2013.01); *H04W 74/004* (2013.01)

(58) Field of Classification Search
None
See application file for complete search history.

(56) References Cited

U.S. PATENT DOCUMENTS

| 2011/0286498 | A1* | 11/2011 | Abrishamkar | H04L 25/0242 |
| | | | | 375/148 |
| 2012/0163484 | A1* | 6/2012 | Wild | H04L 5/0023 |
| | | | | 375/260 |

(Continued)

OTHER PUBLICATIONS

Guo, B., et al., "CPRI compression transport for LTE and LTE-A signal in C-RAN", 2012 7th International ICST Conference on Communications and Networking in China, Aug. 8, 2012, pp. 843-849, IEEE.

(Continued)

*Primary Examiner* — Ayaz Sheikh
*Assistant Examiner* — Sori Aga
(74) *Attorney, Agent, or Firm* — Patent Portfolio Builders, PLLC

(57) ABSTRACT

There is provided improved backhaul communication in a wireless network. The wireless network comprises at least one coordinating network node. The wireless network further comprises at least one cooperative network node. A method performed by the cooperating network node comprises receiving an uplink signal from a wireless device, the uplink signal comprising data. The method further comprises compressively sampling the data so as to obtain compressive measurements of the data. The method further comprises transmitting the compressively sampled data to the coordinating network node. There is also provided a method performed in the coordinating network node. There is further provided a cooperating network node and a coordinating network node arranged to perform the methods and computer programs and computer program products comprising computer program code for implementing the method.

20 Claims, 5 Drawing Sheets

(51) Int. Cl.
    *H04W 16/28*     (2009.01)
    *H04W 74/00*     (2009.01)
    *H04B 7/02*     (2017.01)

(56) References Cited

U.S. PATENT DOCUMENTS

2012/0184218 A1    7/2012    Boudreau
2012/0243468 A1    9/2012    Hui et al.

OTHER PUBLICATIONS

Aulin, J., et al., "Compressive Sensing Aided Determination of WCDMA Constrained Capacity", 2012 IEEE International Conference on Communications (ICC), Jun. 10, 2012, pp. 4072-4077, IEEE.
Jeremic, D., "Compressive Sensing Aided Determination of OFDM Achievable Rate", 2011 IEEE Global Telecommunications Conference, Dec. 5, 2011, pp. 1-6, IEEE.

\* cited by examiner

BACKHAUL COMMUNICATION IN WIRELESS NETWORKS

TECHNICAL FIELD

Embodiments presented herein relate to communications between network nodes, and particularly to backhaul communication in a wireless network comprising at least one coordinating network node and at least one cooperative network node.

BACKGROUND

In wireless communication networks, there is always a challenge to obtain good performance and capacity for a given communications protocol, its parameters and the physical environment in which the wireless communication network is deployed.

The growing demands on communication networks to support data applications at higher throughputs and spectral efficiencies have driven the need to develop Orthogonal Frequency Division Multiplexing (OFDM) based 4th generation (4G) networks including the 3rd generation partnership program (3GPP) Long Term Evolution (LTE) telecommunications standards. A key objective with respect to deployment of OFDM 4G networks is to utilize a frequency re-use of one (denoted by N=1), or as close to N=1 re-use as is practical for the particular communication network at hand. A frequency re-use of N=1 implies that the network nodes (such as the evolved node B, eNB, in LTE) in the cells transmit on all available time-frequency resources blocks (RBs) simultaneously. The need for higher throughputs in 4G networks, especially near the cell edge, combined with the constraint on the uplink link budget may necessitate the need for smaller cell sizes than is typically deployed for present 2nd generation (2G) and 3rd generation (3G) cellular radio communication systems. The addition of smaller cells can be deployed in a traditional homogenous cell splitting approach or in a more ad hoc heterogeneous approach in which pico cells or relay nodes, or integrated WiFi nodes are overlaid on or an extension of an existing macro cellular network. For both a homogeneous and heterogeneous approach, the resulting interference limited system for N=1 deployment may not achieve the full potential capacity that the LTE standard can support without the implementation at the network node and wireless device of one or more viable interference mitigation and or cancellation techniques.

Interference cancellation and mitigation techniques have been investigated and deployed with varying degrees of success in terrestrial mobile networks for over 20 years. Traditional approaches to interference mitigation between transmitted signals have focused on either ensuring orthogonality between transmitted signals in time and/or frequency as well as spatially, or by actively removing and cancelling interfering signals from the desired signal if orthogonality between the desired signal and potential interferers cannot be achieved. In early 2G cellular systems such orthogonality was achieved primarily through static pre-planned allocations of radio resources. 3G systems introduced interference cancellation techniques based mostly on a combination of blind information gathering at a network node such as spectrum usage monitoring and coarse exchange of interference indicators such as the Rise over Thermal (RoT) indicator employed in the 3GPP2 1xEV-DO standard. Typically, interfering signals have been estimated using blind detection and their estimates subtracted from the desired signals.

From a link perspective the downlink (DL) allows for a more tractable analysis since if the desired wireless device location is known, the distances to all potential interfering network nodes can be determined based on the network geometry and hence a probabilistic based estimate of the signal-to-interference-plus-noise ratio (SINR) can be calculated based on channel fading conditions for the desired signal and the interfering signals. In addition to additive white Gaussian noise (AWGN,) both the desired signal and interfering signals will experience shadowing which typically is log-normally distributed. Analysis of the uplink (UL) interference requires knowledge of not only the location of the desired wireless device under consideration, but also the relative locations of all potential interfering wireless devices, for which both the locations of the interfering terminals, the number of potential terminals as well as their spatial velocities will behave as random variables.

In cellular networks it is a well known problem that in medium to heavy loading, the network becomes interference limited which can result in negative signal-to-interference-plus-noise (SINR) ratios, particularly for cell edge users.

The challenge with deploying a static N=1 frequency re-use OFDM system in an interference limited environment is that for a fully loaded deployment, significant regions of coverage will experience negative SINR levels resulting in gaps in the deployed coverage, irrespective of the inter-cell distance. In an interference limited system it is not uncommon for, on the order of 15%, of users to experience negative SINR, with some users experiencing negative SINR levels of −10 to −15 dB. It should be noted that in a fully loaded interference limited cellular deployment, the severity of the SINR degradation will be dependent on the average path loss exponent. For a cellular deployment with a fixed inter-cell distance, high path loss propagation environments with path loss exponents up to a 5th or 6th order will experience less overall interference than deployments with lower path loss exponents, since potential interfering signals from neighbouring cells will be more greatly attenuated in the former case. Even though there will be significant SINR variation depending on the propagation environment, in order to robustly deploy an LTE OFDM system one will have to mitigate the inevitable negative SINR coverage regions that will exist.

Coordinated Multipoint (CoMP) transmissions from multiple eNBs to a UE on the DL or from one wireless device to multiple eNBs on the UL is an approach that can be statically or adaptively employed in heterogeneous cellular network deployments to improve the overall SINR levels, particularly for cell edge users. CoMP implementations can be categorized into joint processing solutions or coordinated solutions. Coordinated solutions can be further categorized into coordinated beamforming or coordinated scheduling. The gain in SINR that can be achieved with UL CoMP is typically at a cost of complexity and an increase in required backhaul signalling, particularly for joint UL processing options.

Both the LTE and LTE-Advanced air interfaces support features that mitigate interference. However, most of the straightforward solutions that exploit these interference mitigation capabilities consume excessive backhaul bandwidths and require a significant use of signal processing resources.

Previous approaches to reduce the backhaul overhead for UL CoMP solutions employed sending soft probabilistic metrics such as log-likelihood ration (LLR) estimates, only for cooperating cells that have a signal above a given SINR threshold. One of the disadvantages of this approach is that it still requires the full sampling of the desired signal at each of the cooperating network nodes in the CoMP solution and can still require the use of large backhaul capacities even when only sending LLR ratio information for cooperating network nodes above a predefined SINR threshold.

Due to evolution of network nodes, a number of standards will evolve to maximize commonality to achieve a multi-standard architecture, given that a network node may support multiple standards. Hence, HSPA which traditionally have network nodes connected to an RNC may also have fiber optic cables connected between the network nodes as well. In the context of UL CoMP, if the fiber optic cables between network nodes are to be shared by both HSPA and LTE architectures, the limit of the capacity of these backhaul connections will be even more severe.

Hence, there is still a need for efficient communications between network nodes.

SUMMARY

An object of embodiments herein is to provide efficient communications between network nodes.

The inventors of the enclosed embodiments have through a combination of practical experimentation and theoretical derivation discovered that wireless networks with CoMP implementations comprising at least one coordinating network node and at least one cooperative network node that can benefit from a joint processing solution, will need to have sufficient backhaul bandwidth to enable sharing the high speed CoMP payload. In the extreme case this payload comprises inphase and quadrature (I/Q) data samples which can result in up to a 20 Gbps peak data rate requirement. Such a CoMP system would require the use of multiple 10Ge links and would be prohibitively expensive and complex to implement in practice. Specifically, it may be necessary to support radio frequency (RF) communications over Ethernet and additional signal processing at the receiver of the serving eNB would grow exponentially with the backhaul bandwidth (BW) in order to process all of the interference data from the cooperating eNBs. Furthermore, much of this DSP processing will be of little benefit if the data from the cooperating eNBs is of poor SINR quality.

A particular object is therefore to provide efficient communications between network nodes enabling a reduction of backhaul bandwidth requirements between network nodes in a wireless network comprising at least one coordinating network node and at least one cooperative network node.

According to a first aspect there is presented a method for backhaul transmission in a wireless network comprising at least one coordinating network node and at least one cooperative network node, the method being performed by the cooperating network node. The method comprises receiving an uplink signal from a wireless device, the uplink signal comprising data. The method comprises compressively sampling the data so as to obtain compressive measurements of the data. The method comprises transmitting the compressively sampled data to the coordinating network node.

Advantageously, use of compressive sampling on uplink transmissions from a target wireless device (WD) to cooperating network nodes in a CoMP session may reduce the number of samples needed to be backhauled to the coordinating network node of the CoMP session.

Further advantageously, compressive sampling does not require the full sampling of the target signal at each cooperating network node, thus reducing signal processing requirements at each network node of the CoMP session.

Further advantageously, the use of compressive sampling enables flexible iterative adaptation of the aggregate throughput of the target WD in combination with the aggregate number of samples employed in the CoMP session.

According to a second aspect there is presented a method for backhaul reception in a wireless network comprising at least one coordinating network node and at least one cooperative network node, the method being performed by the coordinating network node. The method comprises receiving compressively sampled data from a cooperating network node, the data having been comprised in an uplink signal received by the cooperating network node from a wireless device, the data having been compressively sampled by the cooperating network node so as to obtain compressive measurements of the data. The method comprises obtaining estimated data by recovering data from the received compressively sampled data.

According to a third aspect there is presented a cooperating network node for backhaul reception in a wireless network comprising at least one coordinating network node and at least one cooperative network node. The cooperating network node comprises a receiver arranged to receive an uplink signal from a wireless device, the uplink signal comprising data. The cooperating network node comprises a processing unit arranged to compressively sample the data so as to obtain compressive measurements of the data. The cooperating network node comprises an input/output interface arranged to transmit the compressively sampled data to the coordinating network node.

According to a fourth aspect there is presented a coordinating network node for backhaul reception in a wireless network comprising at least one coordinating network node and at least one cooperative network node. The coordinating network node comprises an input/output interface arranged to receive compressively sampled data from a cooperating network node, the data having been comprised in an uplink signal received by the cooperating network node from a wireless device, the data having been compressively sampled by the cooperating network node so as to obtain compressive measurements of the data. The coordinating network node comprises a processing unit arranged to obtain estimated data by recovering data from the received compressively sampled data.

According to a fifth aspect there is presented a computer program for backhaul transmission in a wireless network comprising at least one coordinating network node and at least one cooperative network node, the computer program comprising computer program code which, when run on a cooperative network node, causes the cooperative network node to perform a method according to the first aspect.

According to a sixth aspect there is presented a computer program for backhaul transmission in a wireless network comprising at least one coordinating network node and at least one cooperative network node, the computer program comprising computer program code which, when run on a coordinating network node, causes the coordinating network node to perform a method according to the second aspect.

According to a seventh aspect there is presented a computer program product comprising a computer program according to at least one of the fifth aspect and the sixth aspect and a computer readable means on which the at least one computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The inventive concepts will now be described more fully hereinafter with reference to the accompanying drawings, in which certain embodiments of are shown. The inventive concepts may, however, be embodied in many different forms and should not be construed as limited to the embodiments set forth herein; rather, these embodiments are provided by way of example so that this disclosure will be thorough and complete, and will fully convey the scope of the inventive concepts to those skilled in the art. Like numbers refer to like elements throughout the description.

Figure 1:
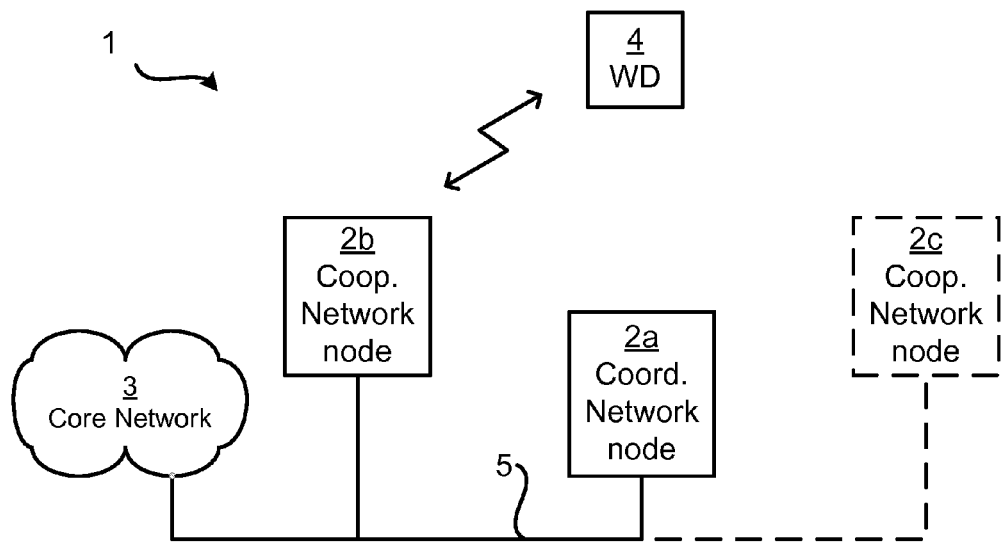
FIG. 1 is a schematic diagram illustrating a wireless network where embodiments presented herein may be applied.

FIG. 1 is a schematic diagram illustrating a wireless network 1 where embodiments presented herein can be applied. The wireless network 1 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), integrated WiFi node within a 3G and/or 4G network in a heterogeneous network scenario, etc., as long as the principles described hereinafter are applicable.

The wireless network 1 comprises network nodes 2a, 2b, 2c, a wireless device (WD) 4 and a core network 3. The core network 3 offers services and service content to the WD 4. In order to access these services and service content the WD 4 is arranged to operatively connect to one or more of the network nodes 2a, 2b, 2c which in turn are connected to the core network 3. The network nodes 2a, 2b, 2c are interconnected by a backhaul 5.

As the skilled person understands, a general wireless network 1 may typically comprise a plurality of WDs 4 and a plurality of network nodes 2a, 2b, 2c. In scenarios where WDs 4 are highly clustered, one or more low-output power micro (or pico) sites could be used to complement a macro site providing basic coverage of a cell. For example, FIG. 1 may exemplify a wireless network 1 of multi-standard network nodes, where a given composite network node may consist of one or more radio remote units (RRU or cooperating network node 2b, 2c) connected to one baseband unit (BBU or coordinating network node 2a). According to embodiments the coordinating network node 2a, the cooperating network nodes 2b, 2c, or the coordinating network node 2a and the cooperating network nodes 2b, 2c are eNBs. A group of network nodes 2a, 2b, 2c may comprise one coordinating network node 2a and at least one cooperating network node 2b. Typically a group of network nodes 2a, 2b, 2c comprises one coordinating network node 2a and two or more cooperating network nodes 2b, 2c. Cooperating network nodes 2b, 2c connected to a single coordinating network node 2a in a configuration as schematically illustrated in FIG. 1 are considered to belong to a group, designated as G1. G1 processes WD uplink signals in their spatial coverage range. However, a given cooperating network node 2b, 2c may be connected to more than one coordinating network node 2a. The network nodes 2a, 2b, 2c are thus categorized as being either a coordinating network node 2a or a cooperating network node 2b, 2c. A macro cell is a cell in the wireless network 1 that provides radio coverage served by a high power network node, typically the coordinating network node 2a, (placed at the macro site) that uses dedicated backhaul. Alternatively, the macro cell may be served by a cooperating node depending on its defined role in the designated group G1. A micro (or pico) cell is a cell in the wireless network 1 served by a low power network node, typically the cooperating network nodes 2b, 2c (placed at the micro/pico sites) that use dedicated backhaul connections and is open to public access. Typically a micro cell transmits at around 5 W and a pico cell transmits at around 1 W. Traditionally, a WD 4 connects to the network node 2a, 2b, 2c from which the downlink signal strength is the strongest, or a WD 4 may connect to a subset of the network node 2a, 2b, 2c from which the respective downlink signal strengths are the strongest.

The embodiments disclosed herein relate to efficient communications between network nodes 2a, 2b, 2c. The embodiments disclosed herein are particularly applicable for enabling efficient backhaul communications between network nodes 2a, 2b, 2c enabling a reduction of backhaul bandwidth requirements between network nodes 2a, 2b, 2c in a wireless network 1 comprising at least one coordinating network node 2a and at least one cooperative network node 2b, 2c. For example, with reference to FIG. 1, one object is to reduce the backhaul bandwidth requirement between cooperating network nodes being eNBs for uplink (UL) coordinate multipoint (CoMP) joint processing by compressively sampling raw I/Q data at each cooperating CoMP network node and transmitting the compressively sampled data back to the eNB acting as the coordinating CoMP network node. As will be further disclosed below, the selection of the compressive sensing functions can be chosen independently at each network node 2a, 2b, 2c of the CoMP implementation or in a shared or collective compressed sensing solution that aims at optimizing the compressive sensing function for the cooperating network node 2b, 2c in the CoMP session. Furthermore the number of samples employed for the compressive sampling can be iteratively adapted at each network node 2a, 2b, 2c to achieve a combination of a target aggregate SINR for the CoMP session and a target aggregate backhaul capacity.

In order to obtain such efficient communications between network nodes 2a, 2b, 2c there is provided a coordinating network node 2a, methods performed in the coordinating network node 2a, and a computer program comprising code, for example in the form of a computer program product, that when run on the coordinating network node 2a, causes the coordinating network node 2a to perform the methods. There is further provided a cooperating network node 2, methods performed in the cooperating network node 2b, and a computer program comprising code, for example in the form of a computer program product, that when run on the cooperating network node 2b, causes the cooperating network node 2b to perform the methods.

Figure 2:
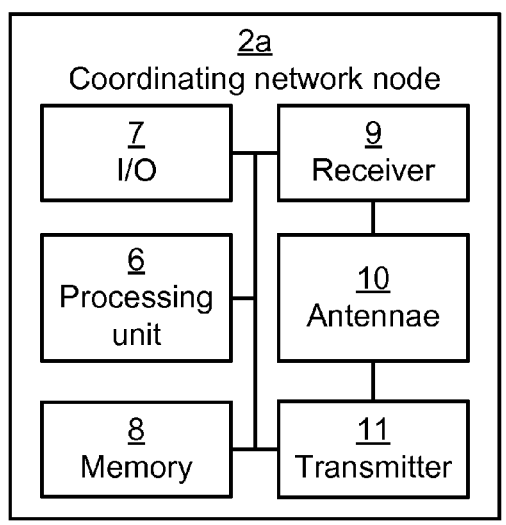
FIG. 2 is a schematic diagram showing functional modules of a coordinating network node.

FIG. 2 schematically illustrates, in terms of a number of functional modules, the components of a coordinating network node 2a. A processing unit 6 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 18 (as in FIG. 4), e.g. in the form of a memory 8. Thus the processing unit 6 is thereby arranged to execute methods as herein disclosed. The memory 8 may also comprise persistent storage, which, for example, can be any single one or combination of magnetic memory, optical memory, solid state memory or even remotely mounted memory. The coordinating network node 2a may further comprise an input/output (I/O) interface 7 for receiving and providing information to the core network 3 and the cooperating network nodes 2c, 2d. The coordinating network node 2a also comprises one or more transmitters 11 and receivers 9, comprising analogue and digital components and a suitable number of antennae 10 for radio communication with the wireless device 4.

The processing unit 6 controls the general operation of the coordinating network node 2a, e.g. by sending control signals to the I/O interface 7, the transmitter 11 and/or the receiver 9 and receiving reports from the I/O interface 7, the transmitter 11 and/or receiver 9 of its operation. Other components, as well as the related functionality, of the coordinating network node 2a are omitted in order not to obscure the concepts presented herein.

Figure 3:
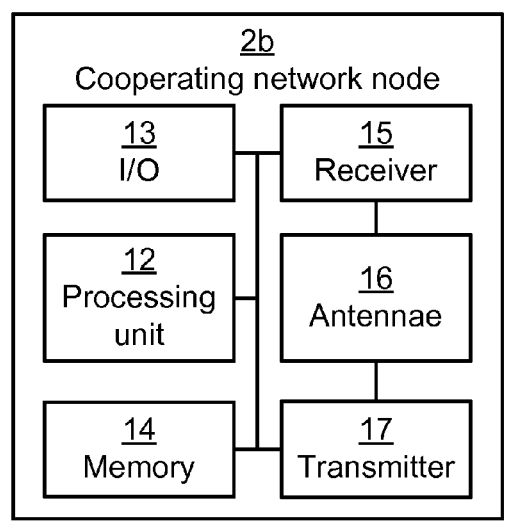
FIG. 3 is a schematic diagram showing functional modules of a cooperating network node.

FIG. 3 schematically illustrates, in terms of a number of functional modules, the components of a cooperating network node 2b. A processing unit 12 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 18 (as in FIG. 4), e.g. in the form of a memory 14. Thus the processing unit 12 is thereby arranged to execute methods as herein disclosed. The memory 14 may also comprise persistent storage, which, for example, can be any single one or combination of magnetic memory, optical memory, solid state memory or even remotely mounted memory. The cooperating network node 2b may further comprise an input/output (I/O) interface 13 for receiving and providing information to the core network 3 and/or the coordinating network node 2a. The cooperating network node 2b also comprises one or more transmitters 17 and receivers 15, comprising analogue and digital components and a suitable number of antennae 16 for radio communication with the wireless device 4. The processing unit 12 controls the general operation of the cooperating network node 2b, e.g. by sending control signals to the I/O interface 13, the transmitter 17 and/or the receiver 15 and receiving reports from the I/O interface 13, the transmitter 17 and/or receiver 15 of its operation. Other components, as well as the related functionality, of the cooperating network node 2b are omitted in order not to obscure the concepts presented herein.

Figure 5:
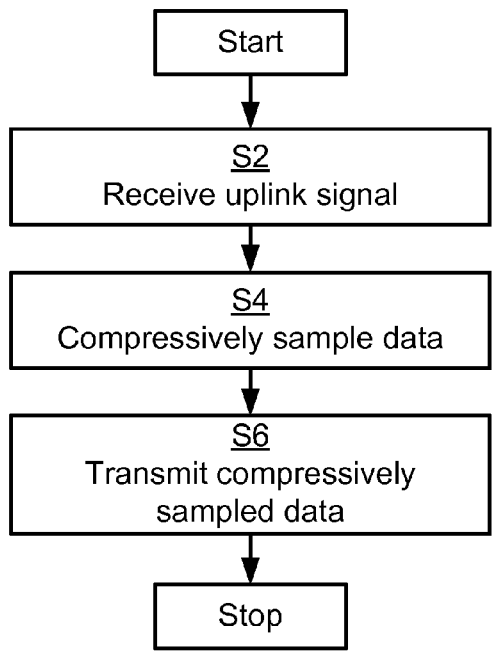
FIGS. 5 to 9 are flowcharts of methods according to embodiments.
Figure 7:
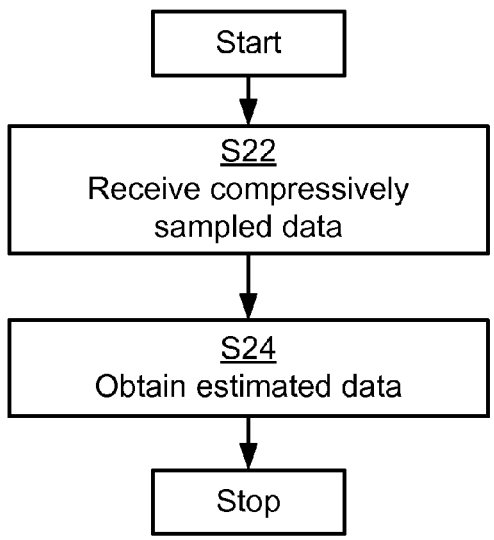
Figure 6:
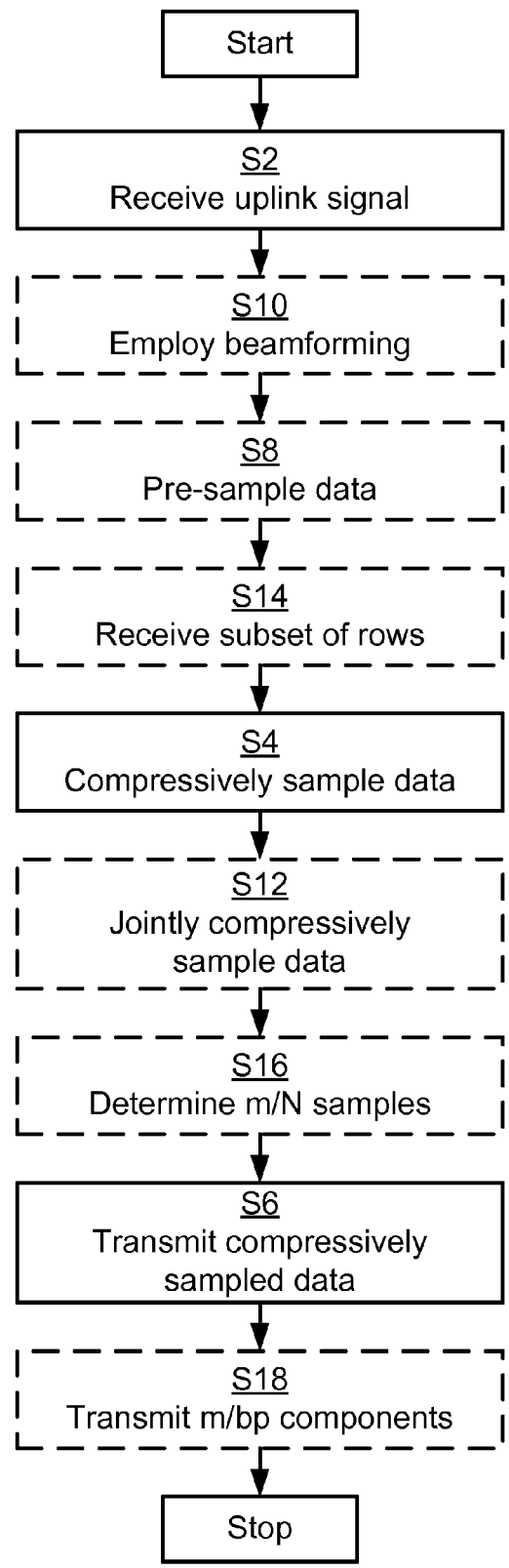
Figure 8:
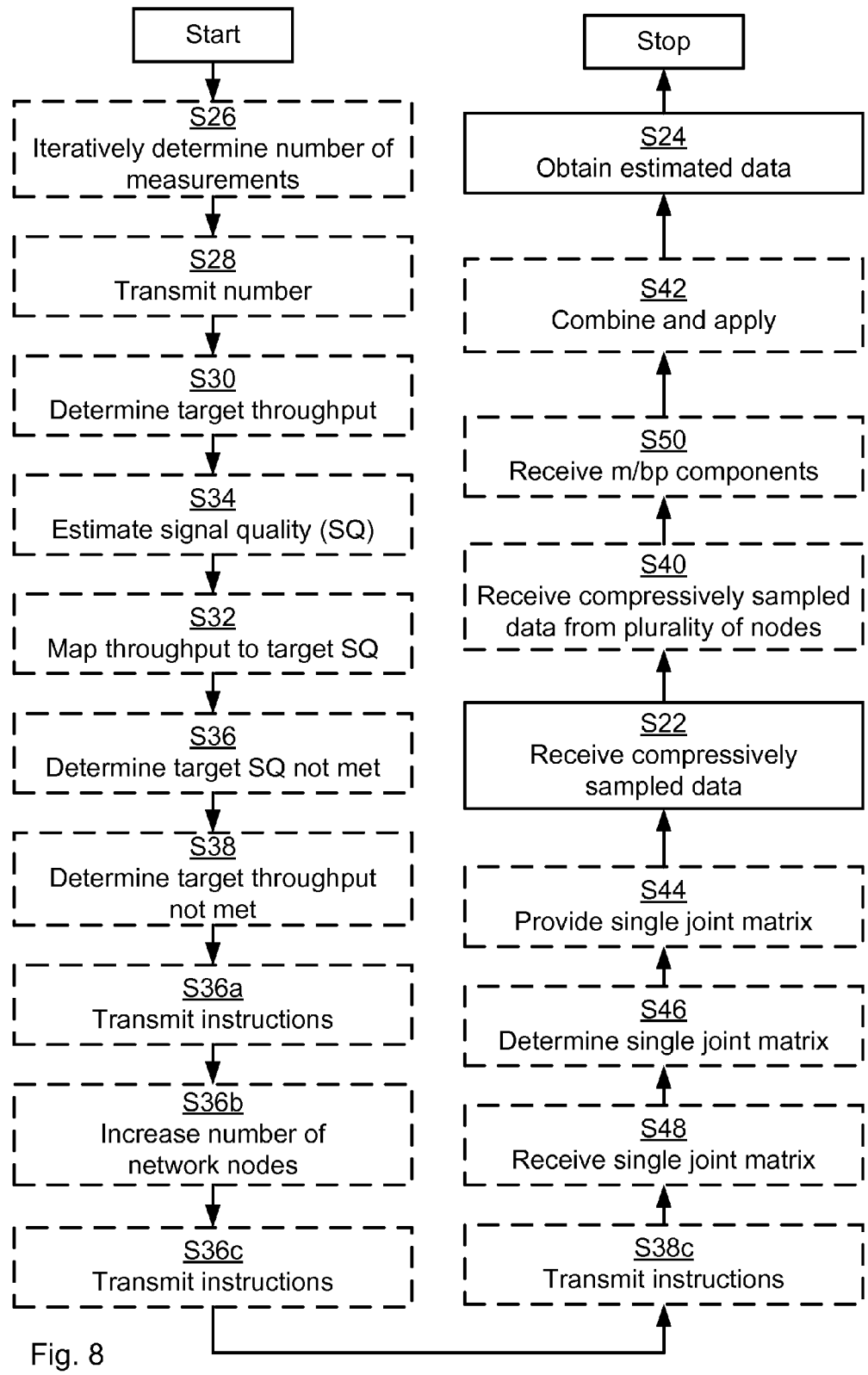

FIGS. 5 and 7 are flow charts illustrating embodiments of methods performed by the cooperating network node 2c for backhaul transmission in a wireless network 1 comprising at least one coordinating network node 2a and at least one cooperative network node 2b, 2c. FIGS. 6 and 8 are flow charts illustrating embodiments of methods performed by the coordinating network node 2a for backhaul reception in a wireless network 1 comprising at least one coordinating network node 2a and at least one cooperative network node 2b, 2c.

Figure 4:
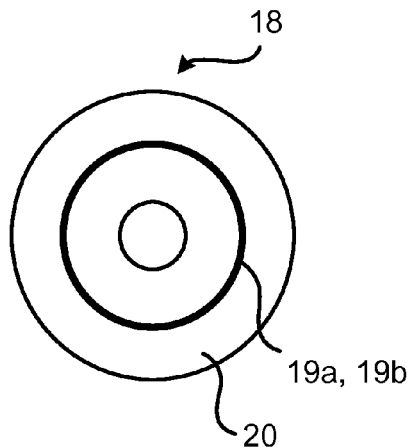
FIG. 4 shows one example of a computer program product comprising computer readable means.

The methods are advantageously provided as computer programs 19a, 19b. FIG. 4 shows one example of a computer program product 18 comprising computer readable means 20. On this computer readable means 20, at least one computer program 19a, 19b can be stored, which at least one computer program 19a, 19b can cause the processing units 6, 12 and thereto operatively coupled entities and devices, such as the memories 8, 14, the I/O interfaces 7, 13, the transmitters 11, 17, the receivers 9, 15 and/or the antennae 10, 16 to execute methods according to embodiments described herein. In the example of FIG. 4, the computer program product 18 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the at least one computer program 19a, 19b is here schematically shown as a track on the depicted optical disk, the at least one computer program 19a, 19b can be stored in any way which is suitable for the computer program product 18.

Methods for backhaul transmission and reception in a wireless network 1 comprising at least one coordinating network node 2a and at least one cooperative network node 2b, 2c will now be disclosed.

In a step S2 the cooperating network node 2b, 2c receives an uplink signal from a wireless device 4. The uplink signal is received by the receiver 15 from the antennae 16 of the cooperating network node 2b, 2c. The uplink signal comprises data. The data may be in-phase and quadrature, I/Q, data.

Further, the data may be raw data. The data is to be transmitted to the coordinating network node 2a. However, the cooperating network node 2b, 2c is arranged to perform processing on the received data before transmitting the data to the coordinating network node 2a. The processing enables efficient communications between the cooperating network node 2b, 2c and the coordinating network node 2a. Particularly, in order to enable a reduction of backhaul bandwidth requirements between the cooperating network node 2b, 2c and the coordinating network node 2a, the data is compressively sampled. The processing unit 12 of the cooperating network node 2b, 2c is therefore arranged to, in a step S4, compressively sample the data so as to obtain compressive measurements of the data. The step S4 may be preceded by at least one pre-processing step. The pre-processing may involve pre-sampling. The processing unit 12 of the cooperating network node 2b, 2c may therefore be arranged to, in a step S8, pre-sample the data prior to compressively sampling the data. However, although herein described as separate process steps, compressive sampling including such pre-processing may be regarded as a single operation. The compressively sampled data may then be transmitted to the coordinating network node 2a. The I/O interface 13 of the of the cooperating network node 2b, 2c is therefore arranged to, in a step S6, transmit the compressively sampled data to the coordinating network node 2a.

The compressively sampled data transmitted by the cooperating network node 2b, 2c is received by the coordinating network node 2a. The I/O interface 7 of the coordinating network node 2a is therefore arranged to, in a step S22, receive the compressively sampled data from the cooperating network node 2a, 2b. As noted above the data has been comprised in an uplink signal received by the cooperating network node from a wireless device 4, and has been compressively sampled by the cooperating network node so as to obtain compressive measurements of the data. The coordinating network node 2a then extracts the data from the compressively sampled data. The processing unit 6 is therefore arranged to, in a step S24, obtain estimated data by recovering data from the received compressively sampled data (i.e. from the compressive measurements of the data).

Particular general embodiments will now be described.

A first general embodiment relates to application of compressive sensing to the network nodes of a homogeneous or heterogeneous network implementation of CoMP as illustrated in FIG. 1. According to this embodiment each network node compressively samples the I/Q data of the UL signal from the target WD 4 to be employed in the UL CoMP session. The compressive sampling may be applied as follows:

(i) A first alternative concerns compressive sampling measurements to be taken independently at each cooperating network node 2b, 2c. That is, according to an embodiment the compressive sampling at one cooperating network node 2b, 2c is performed independently from other cooperating network nodes in the wireless network 1. According to some embodiments compressive sampling (CS) is applied to a single link only where the cooperating network node 2b, 2c has its own CS matrix or CS measurement matrix. This is in contrast to joint CS where a single CS matrix is used where disjoint subsets of rows of the joint CS measurement matrix are allocated to cooperating network nodes 2b, 2c, as will be disclosed in more detail below.

The compressively sampled data from each cooperating network nodes 2b, 2c may thereby be sent to the coordinating network node 2a and be reconstructed independently. The reconstructed signals can then be jointly processed by the processing unit 6 of the coordinating network node 2a using one of a number of joint processing methods including ratio-combining, MRC, interference rejection-combining, IRC, successive interference cancellation, SIC, or parallel interference cancellation, PIC. The UL signal may in the step S4 be blindly compressively sampled by the processing unit 6 of the cooperating network node 2b, 2c. The measurement matrix employed for the compressive sampling can be based on either a random sampling approach or a structured matrix, targeted to known properties of the WD's 4 UL signal.

(ii) A second alternative concerns employing compressive sampling independently on the data channel (i.e. the physical uplink shared channel, PUSCH for LTE) at each of the cooperating network nodes 2b, 2c only if the SINR of the received signal is above a predefined threshold (threshold(i) for the ith cooperating network node of the cooperating set of cooperating network nodes). That is, according to embodiments, compressive sampling is performed independently only if a signal quality, measured at the cooperating network node 2b, 2c and relating to a communications link between the cooperating network node 2b, 2c and the WD 4, is above a predetermined threshold. The estimate of the SINR of the signal can be determined from the reference symbols (sounding reference signals, SRS or demodulation reference signals DM-RS in LTE) of the desired UL WD signal without having to demodulate the data channel. That is, according to embodiments, the uplink signal is received on a data channel.

Since the number of samples required to successfully reconstruct a signal that is compressively sampled varies inversely with the signal to noise ratio of the signal under consideration (i.e. the noisier the signal, the more samples required to reconstruct the compressively sampled signal), the threshold (threshold(i)) at each eNB can be chosen such that the total number of samples chosen falls within a defined capacity constraint of the backhaul network. That is, according to embodiments a number of measurements used to represent the compressively sampled data depends on a signal quality measured at the cooperating network node and relating to a communications link between the cooperating network node and the wireless device.

However, all information (or samples) should be used for compressed sensing (sampling) to give compressed measurements. The number of measurements to be used from a given cooperating network node depends according to this embodiment on the SINR. High SINR implies usage of more CS measurements; a low SINR implies usage of less CS measurements. That is, network nodes that have a lower signal quality will require a higher number of samples to achieve the same effective post-sampling SINR. At network nodes with poor SINR for the desired signal, the number of samples may be restricted to accept a lower effective post compressive sensing SINR, and employ more samples at nodes with a higher estimated pre-sampled SINR.

Figure 9:
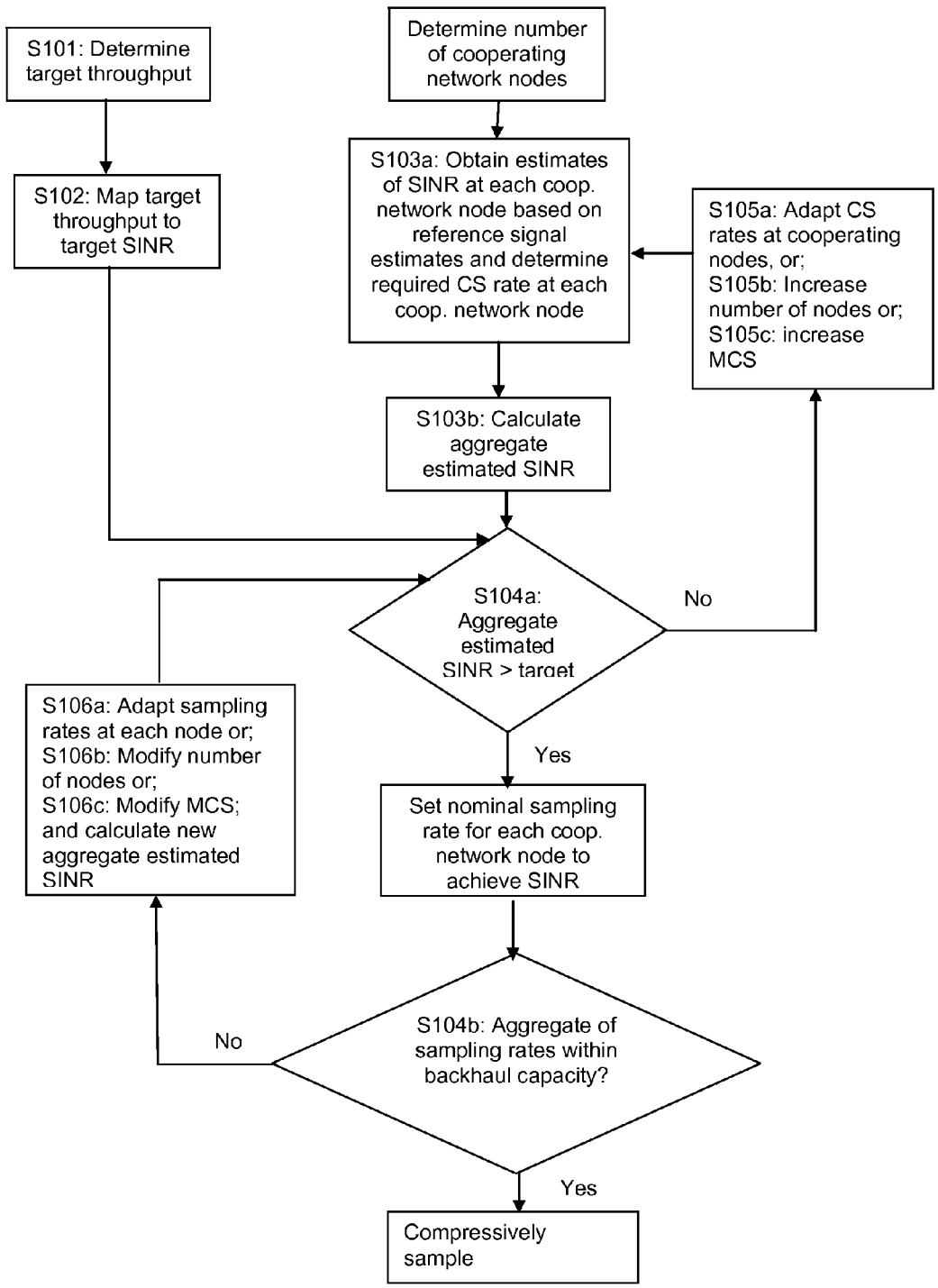

The aggregate throughput may be configured based on an equal weighting of the signals from each cooperating network node 2b, 2c or more generally by a weighting proportional to some defined metric. One such metric can be a weighting proportional to the estimated SINR of the desired signal seen at each cooperating network node 2b, 2c. The process of adjusting the projected throughput and SINR of the UL signal from each compressively sampled node constrained by the available sampling rate that can be accommodated by the backhaul can be iterated until the available throughput is maximized within the total sampling rate constraint. That is, according to embodiments the processing unit 6 of the coordinating network node 2a is arranged to, in a step S26 iteratively determine the number of measurements to be used for the compressive sampling. The I/O interface 7 of the coordinating network node 2a is then arranged to, in a step S28, transmit said iteratively determined number to the cooperating network nodes 2b, 2c. The number of measurements to be used in the compressive sampling by the cooperating network nodes 2b, 2c may thereby be iteratively adapted to meet a target signal quality measured at the cooperating network node 2b, 2c and relating to a communications link between the cooperating network node 2b, 2c and the WD 4. The adaptation of the number of samples to be employed at each cooperating network node 2b, 2c for compressive sensing can be based on the following steps performed by the coordinating network node 2a and as illustrated in the flowchart of FIG. 9:

Step S101: Determine target throughput: The target throughput can be selected by the scheduler based on feedback from the WD 4 of the desired level of service and channel state information (CSI) of the channel quality. That is, the processing unit 6 of the coordinating network node 2a may be arranged to determine the number of measurements by, in a step S30, determining a target throughput.

Step S102: Based on the channel conditions and chosen modulation and coding scheme (MCS), the target throughput can be mapped to a target SINR. That is, the processing unit 6 of the coordinating network node 2a may be arranged to determine the number of measurements by, in a step S32, mapping the target throughput to a target signal quality of a communications link between the cooperating network node and the WD 4.

Step S103a) For each of the cooperating network nodes available for the CoMP session, obtain the estimated SINR of the reference symbols received from each cooperating network node 2b, 2c of the CoMP session, and the compressive sampling rate required to achieve a sampled SINR within a threshold of alpha percent of the nominal estimated SINR. This determination could be achieved by a precalculated lookup table of SINR accuracy versus required compressive sampling rate. The processing unit 6 of the coordinating network node 2a may be arranged to determine the number of measurements by, in a step S34, estimate a signal quality of a communications link between the cooperating network node 2b, 2c and the WD 4 from uplink reference symbols received at the cooperating network node 2b, 2c.

Step S103b) From individual nodal SINR's calculate aggregate estimated SINR. This calculation may be performed by the processing unit 6 of the coordinating network node 2a.

Step S104: Confirm, by the processing unit 6 of the coordinating network node 2a, that:
 a) The aggregate SINR across all of the network nodes within the cooperating CoMP set is greater than the target SINR of the CoMP session and if so set the nominal compressive sampling rate at each cooperating network node 2b, 2c.
 b) The aggregate sampling rate across all of the network nodes within the cooperating CoMP set is within the target backhaul capacity of the wireless network 1 and if so: implement the compressive sampling.

Step S105: If the target aggregate SINR is not met, a number of approaches may be implemented to achieve the target aggregate SINR and hence the target throughput, including, but not limited to:
 a) Adapting the compressive sampling rate at each cooperating network node, while maintaining the total aggregate sampling rate within the available backhaul bandwidth. This can be achieved for example by increasing the sampling rate for network nodes with poor SINR by trading off equivalent sampling rate reductions on network nodes with good SINR. The processing unit 6 of the coordinating network node 2a may therefore be arranged to, in a case wherein compressive sampling at the cooperative network node is performed at a compressive sampling rate, and wherein the number of measurements, in a step S36, determine that the target signal quality is not met. The I/O interface 7 of the coordinating network node 2a is in such a case arranged to, in a step 36a, transmit instructions to the cooperating network nodes 2b, 2c to modify the compressive sampling rate to a higher rate than currently used, i.e. using a higher rate to ensure error in compressive sampling is below a target error rate.
 b) Adapting the number of cooperating network nodes 2b, 2c in the cooperating set. The processing unit 6 of the coordinating network node 2a may therefore be arranged to, in a step S36b, adapt the number of cooperating network nodes 2b, 2c.
 c) Adapting the MCS if permissible for the target SINR. That is, in a case the reception of the data at the cooperative network node is performed using a modulation and coding scheme having at a rate, the number of measurements may be determined by determining (as in step S36) that the target signal quality is not met, and if so: transmitting, in a step S36c and by the I/O interface 7 of the coordinating network node 2a, instructions to the cooperating network nodes 2b, 2c to modify the rate of the modulation and coding scheme. In general terms the MCS can either be increased or decreased depending on difference from the target quality. For example in poor signal quality, either the modulation rate could be lowered, the coding rate (k/n) could be decreased, or both these modifications may be performed.

Step S106: If the target sampling rate is not met, a number of approaches can be employed, as determined by the processing unit 6 of the coordinating network node 2a, to achieve the target aggregate SINR, including but not limited to:
 a) Adapting the compressive sampling rate at each cooperating network node 2b, 2c, while maintaining the total aggregate SINR above the target threshold. This can be achieved for example by decreasing the sampling rate for network nodes with poor SINR and trading off equivalent sampling rate improvement on network nodes with good SINR. The processing unit 6 of the coordinating network node 2a may be arranged to, in a step S38, determine that the target sampling rate is not met. The I/O interface 7 of the coordinating network node 2a is in such a case arranged to, in a step 38a, transmit instructions to the cooperating network node 2b, 2c to adapt (i.e., to increase or decrease) the compressive sampling rate.
 b) Modifying the number of cooperating network nodes 2b, 2c in the cooperating set. The processing unit 6 of the coordinating network node 2a may therefore be arranged to, in a step S38b, modify the number of cooperating network nodes 2a, 2b. For example, the number of cooperating network nodes 2a, 2b would be decreased if the target sampling rate is exceeded and possibly increased if the aggregate sampling rate is below the target rate.
 c) Modifying the MCS if permissible for the target SINR. The I/O interface 5 of the coordinating network node 2a may therefore be arranged to, in a step S38c, transmit instructions to the cooperating network nodes 2b, 2c to modify the rate of the modulation and coding scheme. For example, if the aggregate target sampling rate is exceeded, the MCS may be increased while ensuring that the target SINR is still met, or, if the aggregate sampling rate is below the target, the MCS could be decreased.

2. A second general embodiment relates to augmenting the SINR of the CoMP session with compressively sampled beamforming from one or more cooperating network nodes 2b, 2c of the CoMP session. That is, according to embodiments the antennae 16 of the cooperating network nodes 2b, 2c are arranged to, in a step S10, employ beamforming for receiving the uplink signal. In scenarios for which the target aggregate SINR is too low for a given criterion and where all available cooperating network nodes 2b, 2c that can receive the uplink signal from the candidate WDs 4 are being employed in the aggregate SINR calculation, the SINR may be augmented with a targeted beam from one or more cooperating network nodes in the CoMP session. This approach can be employed to improve the aggregate SINR whilst maintaining a target aggregate sampling rate, or to reduce the aggregate compressive sampling rate of the CoMP session while maintaining the target SINR.

At the coordinating network node 2a of serving cell the compressively sampled signals from the cooperating network nodes 2b, 2c in the CoMP session can be combined using interference mitigating processing approaches such as MRC, IRC, SIC, or PIC. That is, according to embodiments the receiver 9 of the coordinating network node 2a is arranged to, in a step S40, receive compressively sampled data from a plurality of cooperating network nodes. The processing unit 6 of the coordinating network node 2a may then be arranged to, in a step S42, combine and apply interference mitigating to the received compressively sampled data. According to one embodiment the number of measurements of the compressively sampled data varies between the plurality of cooperating network nodes.

3. A third general embodiment relates to applying compressive sampling measurements implemented as a single joint measurement matrix across all cooperating network nodes 2b, 2c. The processing unit 12 of the cooperating network node 2b, 2c is therefore arranged to, in a step S12, jointly perform the compressive sampling with a plurality of further cooperating network nodes 2b, 2c. The joint measurement matrix may then be processed as single entity at the coordinating network node 2a to regenerate an estimate of the desired signal. That is, a single joint matrix, common for the cooperating network node 2b, 2c and the plurality of further cooperating network nodes 2b, 2c, may be used during the jointly performed compressive sampling. Thus, the compressively sampled data received by the coordinating network node 2a from the cooperating network nodes 2b, 2c may be jointly compressively sampled data. Hence, according to an embodiment the processing unit 6 of the coordinating network node 2a is arranged to use a single joint matrix, common for the cooperating network node 2b, 2c and the plurality of further cooperating network nodes 2b, 2c, during joint recovery of the data from the received jointly compressively sampled data.

4. A fourth general embodiment relates to applying compressive sampling measurements implemented as a single joint measurement matrix across all cooperating network nodes 2b, 2c where the joint measurement matrix is determined by the coordinating network node 2a or made available to the coordinating network node 2a. Particularly, the processing unit 6 of the coordinating network node 2a may be arranged to, in a step S46, determine the single joint matrix. Alternatively, the I/O interface 7 of the coordinating network node 2a may be arranged to, in a step S48, receive the single joint matrix. Each cooperating network node 2b, 2c may be allocated a disjoint subset of rows from the single joint measurement matrix. Therefore the I/O interface 13 of the cooperating network nodes 2b, 2c may be arranged to, in a step S14, receive a distinct subset of rows from the single joint measurement matrix. The subsets of rows allocated may be communicated to the respective cooperating network nodes 2b, 2c by the coordinating network node 2a. A given cooperating network node 2b, 2c may be allocated 0, 1, 2, or more rows of the single joint measurement matrix depending on the SINR of the link between the given cooperating network node 2b, 2c and the WD 4. That is, the number of received rows may depend on a signal quality measured at the cooperating network node 2b, 2c and relating to a respective communications link between the cooperating network node 2b, 2c and the WD 4.

Depending on the quality of the link as indicated by for example, the received SINR of the link or some other measure (link reliability index), a cooperating network node 2b, 2c whose link to the WD 4 has a higher SINR (or higher reliability index) than another cooperating network node's 2b, 2c link to the same WD 4 will, according to this embodiment, have more rows of the joint measurement matrix allocated to it. That is, according to embodiments the number of received rows is proportional to the signal quality. In other words, a cooperating network node 2b, 2c with a lower received SINR (or lower reliability index) over its link to the WD 4, will have less rows allocated to it, hence less compressive measurements from this a cooperating network node 2b, 2c. Similarly, a cooperating network node 2b, 2c with a received SINR (or reliability index) over its link to the WD 4 that is below a pre-defined threshold will have no rows allocated to it. That is, according to embodiments the number of received rows is zero in a case where the signal quality is below a predetermined threshold. In such a case, this cooperating network node 2b, 2c is not participating in the associated instant of the joint compressed sensing scheme.

A given cooperating network node 2b, 2c, uses its allocated subset of, say, m rows of the joint measurement matrix, to perform compressed sensing on its received signal to give m measurements to be sent over the backhaul link 5 to the coordinating network node 2b. That is, the step of compressively sampling the data in step S4 as performed by the processing unit 12 of the cooperating network node 2b, 2c may be based on the received distinct subset of rows from the single joint measurement matrix, and wherein a number of measurements in the transmitted compressively sampled data equals the number of received rows. Hence, once the coordinating network node 2a receives all compressed measurements (where the total number of measurements equal the total number of rows of the joint measurement matrix), the coordinating network node 2a may use these measurements along with the joint measurement matrix to regenerate an estimate of the desired signal. As noted above, the joint measurement matrix is processed as single entity at the coordinating network node 2a to regenerate an estimate of the desired signal.

5 A fifth general embodiment relates to applying joint compressive sensing to the backhaul 5 in either code division multiple access (CDMA) based wireless networks or orthogonal frequency-division multiple access (OFDM) based wireless networks, That is, as noted above the wireless network 1 may be one from a CDMA or an OFDM compliant wireless network. The former type of system includes commercial 3GPP standardized high speed packet access (HSPA) systems. The latter type of system, in its essence includes LTE systems and WiFi systems. These different types of systems may be integrated in a single standalone multi-standard network node entity. Such an entity may be composed of sub-entities which are co-located or deployed in different locations. Joint compressive sensing as herein disclosed may also be applied in the backhaul limitation of commercially standardized worldwide interoperability for microwave access (WiMAX) systems. That is, the fifth general embodiment also includes WiMAX based wireless networks. That is, the wireless network 1 may be a WiMAX compliant wireless network.

For simplicity of exposition, a description for communication over a slow flat fading channel is presented first for WCDMA. The general form of the vector channel model derived and subsequent compressive sensing analysis for a general vector channel model also apply to OFDM systems. In practice, for OFDM systems, since the bandwidth of the signal tones are dimensioned such that each received signal tone experiences a slow flat fading channel, this description represents an embodiment which is also applicable for OFDM systems. In practice, for WCDMA systems, the channel experienced by a received signal symbol may also be a slow frequency selective fading channel depending on the propagation environment, including outdoor versus indoor propagation environments. The description below for a slow flat fading channel can be generalized to a slow frequency selective fading channel.

The following description refers to one embodiment of the invention, specifically, a wideband CDMA (WCDMA) system. For uplink closed loop transmit diversity, or uplink multiple input multiple output (MIMO) using two transmit antennae and two receive antennae, the transmitted signals for the two uplink signals in a slow flat fading channel are:

$$\tilde{x}_a(t) = \sum_{n=-\infty}^{\infty}\sum_{m=0}^{N-1} s_n c_m w_1 g(t-nT-mT_c) + \sum_{n=-\infty}^{\infty}\sum_{m=0}^{N-1} jd_n \breve{c}_{\tilde{m}} w_3 g(t-nT-mT_c), \quad (1)$$

$$\tilde{x}_b(t) = \sum_{n=-\infty}^{\infty}\sum_{m=0}^{N-1} s_n c_m w_2 g(t-nT-mT_c) + \sum_{n=-\infty}^{\infty}\sum_{m=0}^{N-1} jd_n \breve{c}_{\tilde{m}} w_4 g(t-nT-mT_c) \quad (2)$$

where $T_c$ is the duration of a chip, and T is the duration of a symbol. The chips $c_m$ and $\breve{c}_{\tilde{m}}$ where m, $\tilde{m}$=0, 1, 2, ..., N−1 are used to spread data symbols $s_n$ and $d_n$ respectively. The complex constants $w_1$, $w_2$, $w_3$, $w_4$ are precoding weights. Assuming a flat fading channel, the received signals from the primary and secondary receive antennas are respectively:

$$\tilde{r}_p(t) = \tilde{x}_a(t)a_{11}(t) + \tilde{x}_b(t+\Delta t)a_{21}(t) + \tilde{n}_{w,p}(t) \quad (3)$$

$$\tilde{r}_s(t) = \tilde{x}_a(t)a_{12}(t) + \tilde{x}_b(t+\Delta t)a_{22}(t) + \tilde{n}_{w,s}(t) \quad (4)$$

where $a_{11}(t)$, $a_{21}(t)$, $a_{12}(t)$, $a_{22}(t)$ are each multiplicative fading processes and $\tilde{n}_{w,p}(t)$, $\tilde{n}_{w,s}(t)$ are mutually statistically independent additive white Gaussian noise processes. Note that the above analysis can also be applied to the general case of a doubly dispersive fading channel. In this case, additional echoes (or independently faded and delayed replicas of the signal are received at both receive antennas.) The simpler case is described here for simplicity of exposition. The time shift, $\Delta t$, is due to time misalignment between the two transmitted signals at the WD 4 and here, is assumed to be zero, i.e. $\Delta t$=0. The model can be generalized to include non-zero WD time misalignment error. The fading experienced over 256 consecutive chips does not vary with time: $a_{ij}(t)\approx a_{ij}$, $i,j\in\{1,2\}$, where $a_{ij}$ are complex constants instantiated from the respective circularly symmetric complex Gaussian process $a_{ij}(t)$ at a given time t.

A received set of observables for sets of data symbols, each set indexed by $\hat{n}$, derived from the filtered received signal on primary receive antenna, is given by $$r_{p\hat{n}\hat{m}} = \int_{-\infty}^{\infty} \tilde{r}_p(t)g(t-\hat{n}T-\hat{m}T_c)dt, \quad (5)$$

$$\hat{m} = 0, 1, 2, \ldots, 255, \hat{n} = 0, 1, 2, \ldots$$

The integration or projection operation above may be implemented using a root raised cosine filter with impulse response, g(t), followed by sampling in time.

A received set of observables for sets of data symbols, each set indexed by $\hat{n}$, derived from the filtered received signal on secondary receive antenna, is given by $$r_{s\hat{n}\hat{m}} = \int_{-\infty}^{\infty} \tilde{r}_s(t)g(t-\hat{n}T-\hat{m}T_c)dt, \quad (6)$$

$$\hat{m} = 0, 1, 2, \ldots, 255, \hat{n} = 0, 1, 2, \ldots$$

The equivalent vector channel model for a received symbol n and chip m at a given receiving cooperating network node 2b, 2c at a remote receiver site is represented by $$\begin{bmatrix} r_{pnm} \\ r_{snm} \end{bmatrix} = \begin{bmatrix} a_{11} & a_{12} \\ a_{21} & a_{22} \end{bmatrix} \begin{bmatrix} x_{anm} \\ x_{bnm} \end{bmatrix} + \begin{bmatrix} n_{pnm} \\ n_{snm} \end{bmatrix} \quad (7)$$

$$= H_{nm}x_{nm} + n_{nm}$$

The entries in matrix $H_{nm}$ are mutually statistically independent.

For an uplink group (say, G1) of cooperating network nodes 2b, 2c, the desired observables of the transmitted set of $\{x_{anm}, x_{bnm}\}$ indexed by n, (of duration say, 256 chips), to be obtained from each cooperating network node 2b, 2c at the coordinating network node 2a are given by $$r = \begin{bmatrix} r_{b1} \\ r_{b2} \\ r_{b3} \\ r_{b4} \end{bmatrix} = \begin{bmatrix} H_{b1} & 0 & 0 & 0 \\ 0 & H_{b2} & 0 & 0 \\ 0 & 0 & H_{b3} & 0 \\ 0 & 0 & 0 & H_{b4} \end{bmatrix} \begin{bmatrix} x_{g1} \\ x_{g1} \\ x_{g1} \\ x_{g1} \end{bmatrix} + \begin{bmatrix} n_{b1} \\ n_{b2} \\ n_{b3} \\ n_{b4} \end{bmatrix}, \quad (8)$$

$$= Hx + n. \quad (9)$$

The sub-vector $r_{b1}$ represents the observables from a first cooperating network node 2b in group G1 given that symbols $x_{g1}$ are transmitted, and the sub-vector $r_{b2}$ represents the observables from a second cooperating network node 2c in group G1 given that symbols $x_{g1}$ are transmitted, etc. The sub-vector of symbols given by $$x_{g1} = [x_{an(0)}x_{bn(0)}x_{an(1)}x_{bn(1)} \cdots x_{an(254)}x_{bn(254)}x_{an(255)}$$
$$x_{bn(255)}]^T$$

is contained in each subvector of observables $r_{bi}$, i=1, 2, 3, 4. The vector x is given by $$x = [x_{g1}x_{g1}x_{g1}x_{g1}]^T$$

and the vector n is given by $$n = [n_{b1}n_{b2}n_{b3}n_{b4}]^T.$$

Submatrix $H_{b1}$ is a block diagonal matrix, where each submatrix of $H_{b1}$ is of the form similar to $H_{nm}$ in equation (7). The entries in submatrix $H_{bi}$, i=1, 2, 3, 4 are statistically independent of the entries in submatrix $H_{bk}$, k=1, 2, 3, 4 for i≠k. The entity 0 in the context of equation (8) signifies a 256×256 matrix of zeroes. The desired measurement vector to be obtained at the by the cooperating network node 2a is the vector of observables given in equation (8). However, the amount of data to be sent exceeds the backhaul capacity between the given group of cooperating network nodes 2b, 2c and the cooperating network node 2a. This means that direct transmission of the subvectors of r from respective cooperating network nodes 2b, 2c in group G1 to the cooperating network node 2a in G1 is not feasible because there is insufficient bandwidth.

To overcome, or at least mitigate, limitations in the backhaul capacity, shared or collective compressed sensing as disclosed herein is implemented by cooperating network nodes 2b, 2c in a given group, and the original data to be reconstructed by the coordinating network node 2a in the same group. According to embodiments disclosed herein, each cooperating network nodes 2b, 2c in the group performs partial compressive sensing as disclosed above in general terms of the vector of observables $r_{bi}$ to be received by the cooperating network node 2a. The vector r can be compressed using compressive sampling given that the data x to be recovered is sparse in some domain.

In compressed sampling, given a vector x to be measured or observed which is sparse in some domain where $x=\Psi\theta$, (and $\theta$ is a sparse vector with a few non-zero elements/coefficients), the number of measurements y of vector x can be reduced by performing the measurements in a measurement domain which is of low coherence to the domain (hereon, referred to as the "sparse" or representation domain) where the representation, $\theta$, of the data vector is sparse. The measurement domain and the representation domain may be related via a linear transformation. The two domains, or in this case, vector spaces, have low coherence when the basis $\Psi$ in the representation domain has low coherence, $\mu(\Phi, \Psi)$, to the basis $\Phi$ in the measurement domain. This is made precise by the following definition of the coherence between the two bases:

$$\mu(\Phi, \Psi) = \sqrt{\tilde{N}} \cdot \max_{1 \le k, j \le \tilde{N}} |\langle \phi_k, \psi_j \rangle| \in [1, \tilde{N}]. \quad (10)$$

The data may thus be represented by $\tilde{N}$ samples. Compressively sampling the data may comprises, by the processing unit 12 of the cooperating network nodes 2b, 2c, in a step S16, determine $\tilde{m}<\tilde{N}$ samples from the $\tilde{N}$ received samples, where $\tilde{m}$ depends on a coherence between a basis in a measurement domain of the data and a basis in a representation domain for the data, a sparsity parameter of the data, and $\tilde{N}$. In other words, when the number of measurements, $\tilde{m}$, satisfy $$\tilde{m} > C\mu^2(\Phi,\Psi)S \log(\tilde{N}), \quad (11)$$

where C is a positive constant, $\tilde{N}$ is the dimension of the representation basis, and S is the sparsity of the data in the representation basis (number of non-zero coefficients), then the data x can be recovered exactly without errors with high probability from in $\tilde{m}<<\tilde{N}$ measurements given by y where $$y=R\Phi x=R\Phi\Psi\theta, \quad (12)$$

$R=[\tilde{I}\ \tilde{0}]$ is an $\tilde{m}\times\tilde{N}$ block diagonal selection matrix where $\tilde{I}$ is an $\tilde{m}\times\tilde{m}$ identity matrix and $\tilde{0}$ is an $\tilde{m}\times(\tilde{N}-\tilde{m})$ matrix with all entries equal to O.

For the above WCDMA embodiment of the invention, the matrix $\Psi$ in $x=\Psi\theta$, is an inverse Discrete Fourier Transform matrix, where $\theta$ is sparse with sparsity $S\le(\tilde{N}/b_p)$, where $b_p$ is the number of cooperating network nodes 2b, 2c in a given uplink group of cooperating network nodes 2b, 2c. The entries of matrix $\Psi$ are given by $$\frac{1}{\sqrt{\tilde{N}}} \left( e^{j2\pi kl/\tilde{N}} \right)_{kl},$$

$0 \le k,l \le (\tilde{N}-1)$ where k is the row index and l is the column index of the matrix. In one alternative of this embodiment, the respective channel at each cooperating network node 2b, 2c is estimated and assumed to be known locally (say with negligible accuracy to simplify the present disclosure) so that the quantity $y_{bi}=H_{bi}^{-1}r_{bi}$ is obtained at each cooperating network node 2b, 2c prior to applying compressive sensing to the observed data and subsequently transmitting via the backhaul the partial compressively sensed data or partial measurements $y_{bi}$ from each respective cooperating network node 2b, 2c to the coordinating network node 2a, where $\tilde{y}=[y_{b1}\ y_{b2}\ y_{b3}\ y_{b4}]^T$. In this embodiment, the matrix $\Phi=I_{\tilde{N}\times\tilde{N}}$ and the measurement vector received at the coordinating network node 2a is given by $$\hat{y}=\tilde{R}\tilde{y}=\tilde{R}[\Phi x+H^{-1}n]=\tilde{R}[\Psi\theta+H^{-1}n]. \quad (13)$$

Here, the selection matrix $\tilde{R}$ selects the first $\tilde{m}/b_p$ components (or any $\tilde{m}/b_p$ components) from each of subvector $y_{bi}$ to form the vector $\hat{y}$. This means that the selection matrix $\tilde{R}$ selects in total $\tilde{m}$ measurements from $\tilde{y}=[y_{b1}\ y_{b2}\ y_{b3}\ y_{b4}]^T$, and can be represented as an $\tilde{N}\times\tilde{N}$ block diagonal matrix with $(\tilde{N}-\tilde{m})$ rows of zeroes. An example representation of the matrix $\tilde{R}$ is $$\tilde{R} = \begin{bmatrix} 1 & 0 & 0 & \cdots & & \cdots & 0 \\ 0 & 1 & 0 & \cdots & & \cdots & 0 \\ 0 & 0 & 0 & 0 & & \cdots & 0 \\ 0 & \cdots & 0 & \ddots & & & \vdots \\ \vdots & & & & \ddots & & \\ & & & & \ddots & 0 & \vdots \\ & & & & 0 & 1 & 0 & 0 \\ \vdots & & & & & 0 & 1 & 0 \\ 0 & \cdots & & & \cdots & 0 & 0 & 0 \end{bmatrix}.$$

According to the disclosed compressive sensing scheme, a cooperating network node 2b, 2c, referenced to by index bi, needs to transmit only a partial measurement, consisting of the first in $\tilde{m}/b_p$ components (or any $\tilde{m}/b_p$ components) of the local full measurement vector, $y_{bi}$, over the backhaul 5. That is, according to embodiments the wireless network 1 comprises a number $b_p$ of cooperating network nodes 2b, 2c, and wherein the I/O interface 13 of the cooperating network nodes 2b, 2c is arranged to, in a step S18, transmit in $\tilde{m}/b_p$ measurements of the compressively sampled data. Hence, the I/O interface 7 of the coordinating network node 2a may be arranged to, in a step S50, receive $\tilde{m}/b_p$ measurements of the compressively sampled received data, wherein $\tilde{m}$ depends on a coherence between a basis in a measurement domain of the data and a basis in a representation domain for the data, a sparsity parameter of the data, and the total number of samples N.

By means of the herein disclosed embodiments the need to send full measurement vectors consisting of $\tilde{N}$ components from each cooperating network node 2b, 2c over the backhaul 5 resulting in the coordinating network node 2a receiving $b_p\times\tilde{N}$ measurements, where as defined, above $b_p$ is the number of cooperating network nodes 2b, 2c in the uplink group of cooperating network nodes 2b, 2c, is avoided. This reduces the backhaul requirements from $\tilde{N}$ measurements to $\sim S\cdot\log \tilde{N}$ measurements to be provided to the coordinating network node 2a since $\mu(\Phi, \Psi)=1$ in this case. At the coordinating network node 2a, once a set of measurements $\hat{y}$ is obtained, comprised of the first $\tilde{m}/b_p$ measurement components (or any $\tilde{m}/b_p$ components) of each of vectors $y_{bi}$, i=1, 2, ..., $b_p$, the following linear program $$\hat{\theta} = \underset{\theta \in R^{\tilde{N}}}{\arg\min} \|\theta\|_{l_1} \quad \text{s.t.} \quad \|\tilde{R}\Psi\theta - \hat{y}\|_{l_2} \le \varepsilon \qquad (14)$$

may be solved to recover an approximation to θ, denoted $\hat{\theta}$, and where ε is a bound on the noise which can be selected as $\varepsilon \ge \|H^{-1}n\mu_{l_2}\|$. An estimate of the data symbols can be determined via the linear transformation $$\hat{x} = \Psi\hat{\theta}. \qquad (15)$$

Another alternative is where the knowledge of the channel is used at the coordinating network node 2a rather than at the cooperating network nodes 2b, 2c. This means that the matrix $\Phi = I_{\tilde{N} \times \tilde{N}}$ is replaced with $\Phi = H$ and also that the additive impairment includes both additive noise and interference.

The above disclosed embodiments, from equation (8) to the line immediately above, also applies to OFDM systems when the channel matrix H in equation (9) is properly interpreted when applied to the derived equivalent vector channel model for OFDM systems $$r = As + n \qquad (16)$$

where A is the so-called "effective channel" for the OFDM system and s is the vector of OFDM data symbols.

The disclosed embodiments scale well when the number of cooperating network nodes 2b, 2c is increased. The number of cooperating network nodes 2b, 2c can be easily increased without increase in complexity, i.e. the total number of measurements $\tilde{m}$ required remains the same and hence, the complexity of the linear program to be solved at the coordinating network node 2a remains relatively the same.

The number of measurements, $\tilde{m}_i$, from each cooperating network node 2b, 2c may vary independently as long as the total number of measurements remain the same i.e. equal to $$\tilde{m} = \sum_{i=1}^{b_p} \tilde{m}_i.$$

This facilitates obtaining more measurements from a given cooperating network node 2b, 2c when its measurements of the received signal are more reliable. The backhaul requirements can be reduced from $\tilde{N}$ measurements to $\sim S \cdot \log \tilde{N}$ measurements to be provided to the coordinating network node 2a, with the application of compressed sensing to the backhaul, where in this case $\mu(\Phi, \Psi) = 1$. This approach can increase UL and DL throughput by 3 to 4 dB (a factor of 2 or greater), while minimizing the backhaul bandwidth required for the joint processing and concurrently maximizing the number of cooperating network nodes in each group of cooperating network nodes.

The present disclosure has mainly been described above with reference to a few embodiments. However, as is readily appreciated by a person skilled in the art, other embodiments than the ones disclosed above are equally possible within the scope of the present disclosure, as defined by the appended patent claims. For example, the present disclosure can be applied in several possible scenarios, including homogeneous networks, heterogeneous networks and shared cell or CeNB deployments.

The invention claimed is:

1. A method for backhaul transmission in a wireless network, the wireless network comprising one or more coordinating network nodes and one or more cooperating network nodes, the method comprising:
a cooperating network node from the one or more cooperating network nodes receiving an uplink signal from a wireless device, the uplink signal comprising data;
the cooperating network node compressively sampling the data so as to obtain compressive measurements of the data, wherein the compressive sampling is performed independently of other cooperating network nodes from the one or more cooperating network nodes in the wireless network, and wherein the compressive sampling is performed independently only if a signal quality, measured at the cooperating network node and relating to a communications link between the cooperating network node and the wireless device, is above a predetermined threshold; and
the cooperating network node transmitting the compressively sampled data to a coordinating network node from the one or more coordinating network nodes.

2. The method of claim 1, wherein the data is in-phase and quadrature data.

3. The method of claim 1, wherein the uplink signal is received on a data channel.

4. The method of claim 1, wherein a number of measurements used to represent the compressively sampled data depends on the signal quality measured at the cooperating network node and relating to the communications link between the cooperating network node and the wireless device.

5. The method of claim 1, further comprising pre-sampling the data prior to compressively sampling the data.

6. The method of claim 1, wherein the data is raw data.

7. The method of claim 1, further comprising employing beamforming for receiving the uplink signal.

8. The method of claim 1, further comprising jointly performing the compressive sampling with a plurality of further cooperating network nodes.

9. The method of claim 8, wherein a single joint matrix, common for the cooperating network node and the plurality of further cooperating network nodes, is used during the jointly performed compressive sampling.

10. The method of claim 9, wherein the single joint matrix has been determined by the coordinating network node.

11. The method of claim 9, wherein the single joint matrix has been provided to the coordinating network node.

12. The method of claim 9, further comprising receiving a distinct subset of rows from the single joint measurement matrix.

13. The method of claim 12, wherein the number of received rows depends on the signal quality measured at the cooperating network node and relating to the communications link between the cooperating network node and the wireless device.

14. The method of claim 13, wherein the number of received rows is proportional to the signal quality.

15. The method of claim 13, wherein the number of received rows is zero in response to the signal quality being below a predetermined threshold.

16. The method of claim 12:
wherein the compressively sampling the data is based on the received distinct subset of rows from the single joint measurement matrix; and
wherein a number of measurements in the transmitted compressively sampled data equals the number of received rows.

17. The method of claim 1, wherein the wireless network is one of:

a code division multiple access (CDMA) compliant wireless network;

an orthogonal frequency-division multiple access (OFDM) compliant wireless network;

worldwide interoperability for microwave access (WiMAX) compliant wireless network;

an integrated WiFi node within a 3G and/or 4G network in a heterogeneous network scenario.

18. The method of claim 1, wherein the data is represented by N samples, and wherein compressively sampling the data comprises determining m<N samples from the N received samples, where m depends on a coherence between a basis in a measurement domain of the data and a basis in a representation domain for the data, a sparsity parameter of the data, and N.

19. The method of claim 18:

wherein the wireless network further comprises a number $b_p$ of cooperating network nodes; and wherein transmitting the compressively sampled data comprises transmitting $\tilde{m}/b_p$, measurements of the compressively sampled data.

20. A computer program product stored in a non-transitory computer readable medium for controlling backhaul reception in a wireless network, the wireless network comprising one or more coordinating network nodes and one or more cooperative network nodes, the computer program product comprising software instructions which, when run on one or more processing circuits of a cooperative network node from the one or more cooperative network nodes, causes the cooperative network node to:

receive an uplink signal from a wireless device, the uplink signal comprising data;

compressively sample the data so as to obtain compressive measurements of the data wherein the data is compressively sampled independently of other cooperative network nodes from the one or more cooperative network nodes in the wireless network, and wherein the data is compressively sampled independently only if a signal quality, measured at the cooperative network node and relating to a communications link between the cooperative network node and the wireless device, is above a predetermined threshold;

transmit the compressively sampled data to a coordinating network node from the one or more coordinating network nodes.

* * * * *